(12) United States Patent
Gong (10) Patent No.: US 8,548,101 B2
(45) Date of Patent: Oct. 1, 2013

(54) DEMODULATION METHOD AND DEMODULATOR FOR ORTHOGONAL FREQUENCY MULTIPLEXING—MULTIPLE INPUT MULTIPLE OUTPUT SYSTEM

(75) Inventor: Ming Gong, Guangdong Province (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 13/258,066

(22) PCT Filed: May 17, 2010

(86) PCT No.: PCT/CN2010/072855
§ 371 (c)(1),
(2), (4) Date: Dec. 17, 2011

(87) PCT Pub. No.: WO2011/035594
PCT Pub. Date: Mar. 31, 2011

(65) Prior Publication Data
US 2012/0183103 A1    Jul. 19, 2012

(30) Foreign Application Priority Data
Sep. 28, 2009  (CN) .......................... 2009 1 0177862

(51) Int. Cl.
*H04L 27/06* (2006.01)

(52) U.S. Cl.
USPC .......................................................... 375/340

(58) Field of Classification Search
None
See application file for complete search history.

(56) References Cited

U.S. PATENT DOCUMENTS

| | | | |
|---|---|---|---|
| 2007/0053282 A1* | 3/2007 | Tong et al. | 370/208 |
| 2007/0104283 A1* | 5/2007 | Han et al. | 375/260 |
| 2007/0291867 A1* | 12/2007 | Khan et al. | 375/267 |
| 2008/0116127 A1 | 5/2008 | Curt et al. | |
| 2008/0205259 A1 | 8/2008 | Shtin | |
| 2008/0239938 A1* | 10/2008 | Jalloul et al. | 370/201 |

(Continued)

FOREIGN PATENT DOCUMENTS

| | | |
|---|---|---|
| CN | 1838655 A | 9/2006 |
| CN | 1855797 A | 11/2006 |
| CN | 101692665 A | 4/2010 |
| WO | 2008139865 A1 | 11/2008 |

OTHER PUBLICATIONS

International Search Report for PCT/CN2010/072855 dated Aug. 2, 2010.

*Primary Examiner* — Chieh M Fan
*Assistant Examiner* — Bahman Badipour
(74) *Attorney, Agent, or Firm* — Ling Wu; Stephen Yang; Ling and Yang Intellectual Property (57) ABSTRACT

A demodulation method and a demodulator for an OFDM MIMO system are provided, and by using a received reference signal, the channel estimation value at the reference signal sub-carrier in each channel is obtained by estimation; by using the channel estimation value, an equalization matrix at the reference signal sub-carrier is obtained; by using the obtained equalization matrix to carry out the interpolation calculation, equalization matrixes are obtained; by using the data signals in various paths and corresponding equalization matrixes, an intermediate estimation value is obtained by calculation; by using a precoding matrix to carry out de-precoding on the intermediate estimation value, a final estimation value is obtained. The demodulator comprises an OFDM demodulation module, a frame parsing module, a precoding matrix generation module, a partial channel estimation module, a partial equalization matrix generation module, an equalization matrix interpolation module, a MIMO demodulation module and a de-precoding module.

9 Claims, 3 Drawing Sheets

(56) References Cited

U.S. PATENT DOCUMENTS

| | | | |
|---|---|---|---|
| 2008/0268862 A1* | 10/2008 | Kent et al. | 455/452.2 |
| 2011/0065453 A1* | 3/2011 | Baldemair et al. | 455/456.1 |
| 2011/0149942 A1* | 6/2011 | Ko et al. | 370/343 |
| 2011/0299582 A1* | 12/2011 | Robert et al. | 375/229 |
| 2012/0082119 A1* | 4/2012 | Chung et al. | 370/329 |
| 2012/0128088 A1* | 5/2012 | Ko et al. | 375/260 |
| 2012/0224659 A1* | 9/2012 | Yu et al. | 375/340 |
| 2012/0230233 A1* | 9/2012 | Jia et al. | 370/280 |
| 2013/0021991 A1* | 1/2013 | Ko et al. | 370/329 |

* cited by examiner

DEMODULATION METHOD AND DEMODULATOR FOR ORTHOGONAL FREQUENCY MULTIPLEXING—MULTIPLE INPUT MULTIPLE OUTPUT SYSTEM

TECHNICAL FIELD

The present invention relates to a demodulator method, and especially, to a demodulation method and demodulator in an Orthogonal Frequency Division Multiplexing (OFDM)-Multiple Input Multiple Output (MIMO) communication system.

BACKGROUND OF THE RELATED ART

With the increasing demand of mobile communication users, the high data rate and high frequency spectrum efficiency is becoming one of the main requirements of the mobile communication system, and the advanced technology corresponding to it, such as OFDM technology and MIMO technology, also becomes the main stream supporting technology of the current broadband mobile communication system, and it is developed and applied in multiple practical systems, such as Worldwide Interoperability for Microwave Access (WiMax) system, Long Term Evolution (LTE) system, etc.

Figure 1:
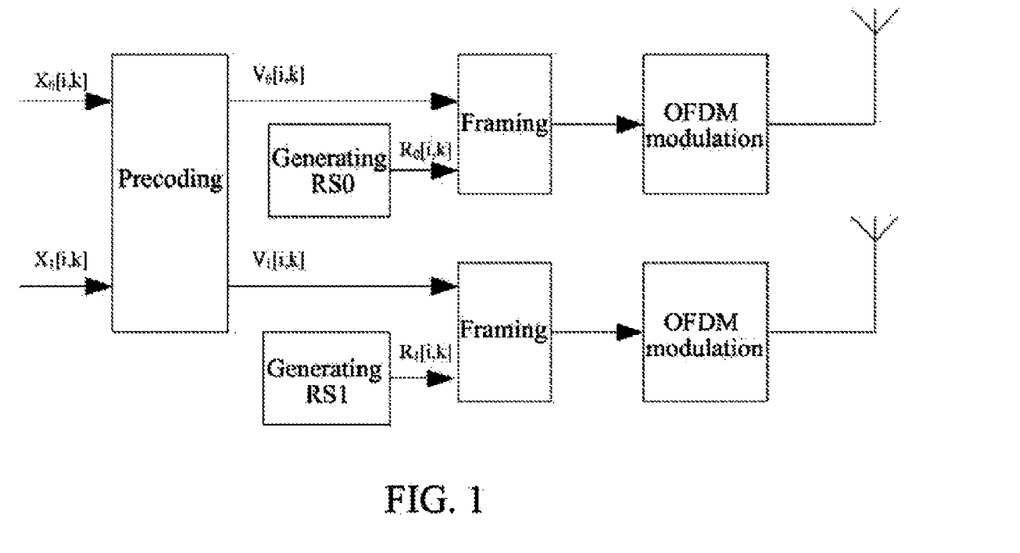
FIG. 1 is a schematic diagram of the existing OFDM-MIMO transmitter.

FIG. 1 is a schematic diagram of classical OFDM-MIMO transmitter; without loss of generality, take two transmitting antennas for example here. At the i-th symbol, data symbols $X_0[i,k]$, $X_1[i,k]$ (k represents the sequence number of sub-carrier) of signals in two paths are pre-coded firstly to obtain $V_0[i,k]$, $V_1[i,k]$:

$$\begin{pmatrix} V_0[i,k] \\ V_1[i,k] \end{pmatrix} = W(i,k) \begin{pmatrix} X_0[i,k] \\ X_1[i,k] \end{pmatrix}$$

W(i,k) is a 2×2 precoding matrix. In the open loop system, the function of precoding is generally mapping signals $X_0$ and $X_1$ in two paths to two different physical antennas, and obtaining a definite spatial diversity gain; in the close loop system, precoding can make radiation mode of the transmitting antenna further approximate to the intrinsic mode of MIMO channel by selection, so as to achieve the purpose of increasing the link gain. Whether it is open-loop or close-loop, transceiver can know precoding matrix W(i,k) on each sub-carrier either by reaching an agreement in advance or by way of channel associated signaling.

Figure 2:
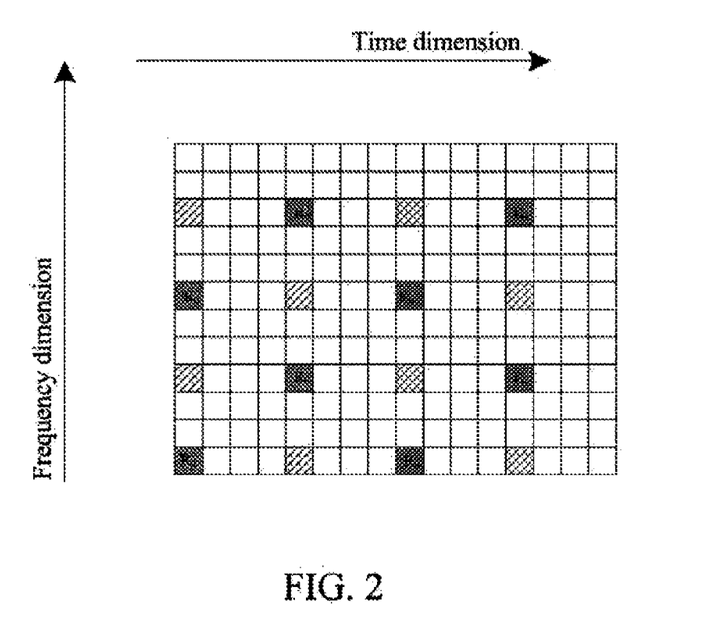
FIG. 2 is a partial diagram of time frequency distribution of the reference signal used for channel estimation of antenna 0.
Figure 3:
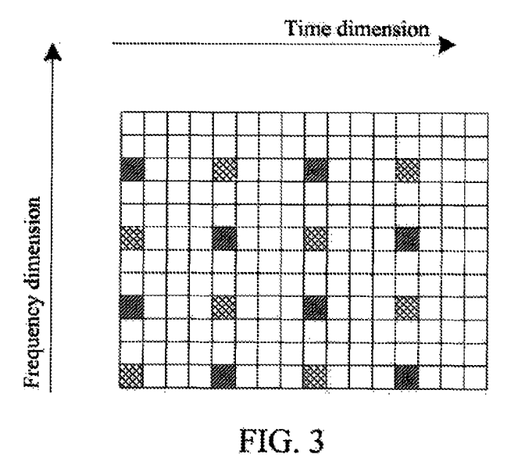
FIG. 3 is a partial diagram of time frequency distribution of the reference signal used for channel estimation of antenna 1.

The data $V_0[i,k]$, $V_1[i,k]$ on which precoding is carried out multiplexes with the reference signal, which constitutes an OFDM data frame. For the signal of $0^{th}$ path, as shown in FIG. 2, the reference signal $R_0$ used for channel estimation is distributed in gap at a plurality of different OFDM sub-carriers. The grid marked with slashes and "$R_0$" represents the time domain resources for transmitting the reference signal $R_0$ in the signal of $0^{th}$ path, and the content of signal is known by the receiver and transmitter; the grid with cross-lines corresponds to the time domain resources bearing the reference signal $R_1$ and the antenna of $0^{th}$ path does not transmit any signal in these time domain resources. Other places correspond to the transmission of data $V_0[i,k]$. The reference signal $R_1$ is transmitted in the signal of $1^{st}$ path, and FIG. 3 also has the similar distribution of time domain, and the grid marked with slashes and "$R_1$" in FIG. 3 represents the time domain resources for transmitting the reference signal $R_1$ in the signal of $1^{st}$ path while the grid with cross-lines correspond to the time domain resources bearing the reference signal $R_0$ and the antenna of $1^{st}$ path does not transmit any signal in these time domain resources. It should be noted that upload the time-frequency position of $R_0$ in $0^{th}$ path and don't transmit any signal in $1^{st}$ path, which can avoid the influence of MIMO signal on the channel estimation. For the signal $R_1$, there is similar design.

For the $i^{th}$ OFDM frame of signal of $n^{th}$ path, carry out IFFT transform, interpose cyclic prefix and send it to the $n^{th}$ antenna for transmission.

Figure 4:
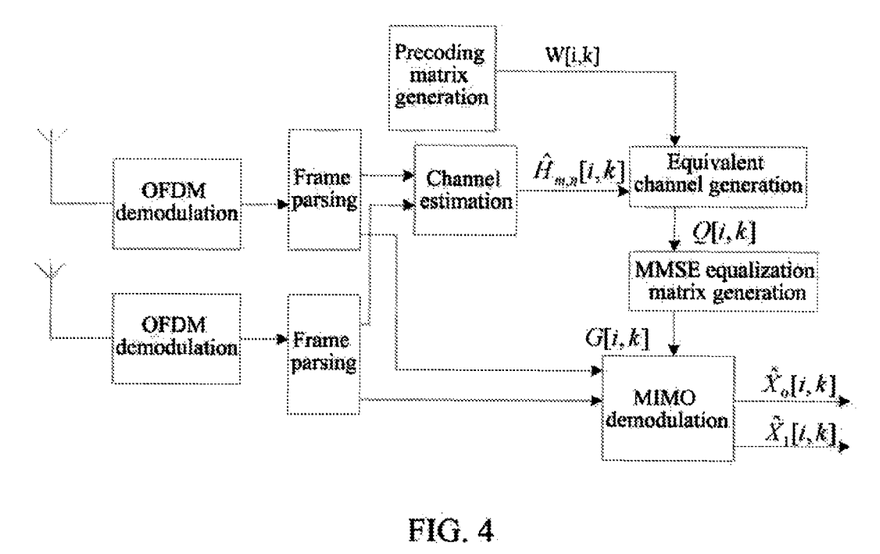
FIG. 4 is a schematic diagram of the existing OFDM-MIMO receiver.

At the receiving end, there is a plurality of antennas to receive signal, and still take 2 antennas as an example, the classical OFDM-MIMO receiver is shown in FIG. 4. The $m^{th}$ antenna accomplishes synchronous frame segmentation, removing cyclic prefix and fast Fourier transform (FFT) in the OFDM demodulation module after receiving signals, so as to obtain the frequency domain signal of the multi-frame in the $m^{th}$ path.

The frame parsing module separates the received data signal part from the reference signal part according to protocol. The received signal module is:

$$\begin{pmatrix} Y_0[i,k] \\ Y_1[i,k] \end{pmatrix} = H(i,k)W(i,k) \begin{pmatrix} X_0[i,k] \\ X_1[i,k] \end{pmatrix} + U(i,k) \quad (1)$$

Wherein, $Y_0[i,k]$, $Y_1[i,k]$ represents the frequency domain signal at the $k^{th}$ data sub-carrier within the $i^{th}$ OFDM symbol received by the $0^{th}$ and $1^{st}$ antennas respectively, and H(i,k) is the 2×2 channel transmission matrix at the $k^{th}$ data sub-carrier within the $i^{th}$ OFDM symbol. U(i,k) is a 2×1 noise vector matrix here, and set noise power of each dimension as $N_0$. k=0, 1, . . . , K, K is the largest sequence number of the sub-carrier, i=0, 1, . . . , I, and I is the largest sequence number of the OFDM symbol in one radio frame.

Using the received reference signal can obtain the channel estimation value from the $n^{th}$ transmitting antenna to $m^{th}$ receiving antenna, wherein the channel estimation value at $k^{th}$ sub-carrier within $i^{th}$ OFDM symbol is denoted as $\hat{H}_{m,n}[i,k]$, and combined with distribution pattern of the reference signal shown in FIG. 2 and FIG. 3, for the channel estimation of $\hat{H}_{m,n}[i,k]$, the method is generally as below:

Step A, carry out the initialization firstly, and set all the $\tilde{H}_{m,n}[i,k]=0$, and $\tilde{H}_{m,n}[i,k]$ is the channel estimation value before filtering at $l^{th}$ sub-carrier within $j^{th}$ OFDM symbol;

Step B, perform the channel estimation for all of the sub-carriers bearing the reference signal within $j^{th}$ OFDM symbol:

$$\tilde{H}_{m,n}[j,l]=R_n^*[j,l]Y_m[j,l]$$

Wherein, $Y_m[j,l]$ represents the frequency domain signal at $l^{th}$ sub-carrier within $j^{th}$ OFDM symbol received from the $m^{th}$ antenna, $R_n$ is the reference signal of the $n^{th}$ antenna transmitted at $l^{th}$ sub-carrier within $j^{th}$ OFDM, j is the sequence number of OFDM bearing the reference signal and l is the sequence number of the sub-carrier bearing the reference signal within $j^{th}$ OFDM.

"The reference signal sub-carrier" and "data sub-carrier" mentioned in the text are common names in the industry, which refers to the time domain resources bearing the reference signal, and the time domain resources are in the scope limited by one OFDM symbol and one sub-carrier, which can be called the Resource Element (RE), therefore the reference signal sub-carrier is also called the reference RE and the data sub-carrier is also called the data RE. Similarly, "sub-carrier" described in "sub-carrier of OFDM symbol" and "at the sub-carrier" mentioned in the text also refers to the time domain resources limited by one OFDM symbol and one sub-carrier, which is also called the RE.

Step C, for each sub-carrier which does not transmit any signal within $j^{th}$ OFDM, use the channel estimation value at two reference signal sub-carriers which have the same frequency domain as the sub-carrier and have most adjacent time domains to the sub-carrier to perform time domain interpolation, so as to obtain the channel estimation value at the sub-carrier;

basing on the distribution of the reference signal in FIG. 2 and FIG. 3, perform time domain interpolation at $(l+3)^{th}$ sub-carrier within $j^{th}$ OFDM:

$$\tilde{H}_{m,n}[j, l+3] = \frac{1}{2}\tilde{H}_{m,n}[j+4, l+3] + \frac{1}{2}\tilde{H}_{m,n}[j-4, l+3]$$

Of course, the interpolation operation of the step can also has other methods, for example, take channel estimation values at adjacent 4 or more reference signal sub-carriers to perform the time domain interpolation.

The above three steps obtain the channel estimation value at the reference signal sub-carrier of the signal in each path in the channel from $n^{th}$ transmitting antenna to $m^{th}$ receiving antenna.

Step D, calculate the channel estimation value at each data sub-carrier within $j^{th}$ OFDM symbol by the frequency domain interpolation, and perform frequency domain filtering for each sub-carrier, so as to obtain the channel estimation values after filtering at all of the sub-carriers within the OFDM symbol;

for each sub-carrier of $j^{th}$ OFDM symbol, perform operation by the following formula:

$$\hat{H}_{m,n}[j, k] = \sum_{f=-L/2}^{L/2} F(f)\tilde{H}_{m,n}[j, k+f]$$

Wherein, L is the data window length of the frequency domain interpolation filter, which determines the range of value of f. F(f) is a low pass filter, and the design of its passband and stopband can refer to the priori knowledge of channel impulse response length and the like.

Step E, for each sub-carrier on OFDM symbol which does not bear the reference signal, use the channel estimation values at two sub-carriers which have the same frequency as the sub-carrier on two most adjacent OFDM symbols bearing the reference signal to perform the interpolation operation, so as to obtain the channel estimation value at the sub-carrier.

Performing the time domain interpolation at $k^{th}$ sub-carrier within $(j+d)^{th}$ (d=1, 2, 3) OFDM:

$$\hat{H}_{m,n}[j+d, k] = \frac{4-d}{4}\tilde{H}_{m,n}[j, k] + \frac{d}{4}\tilde{H}_{m,n}[j+4, k]$$

By the above operation of each step, the channel estimation values at whole time frequency resources of the channel from $n^{th}$ transmitting antenna to $m^{th}$ receiving antenna are obtained. When m,n takes different values, it may obtain $\hat{H}_{m,n}[i,k]$ of each channel, and these $\hat{H}_{m,n}[i,k]$ can constitute the estimated channel transmission matrix $\hat{H}(i,k)$.

The channel transmission model of formula (I) can be equivalent to:

$$\begin{pmatrix} Y_0[i, k] \\ Y_1[i, k] \end{pmatrix} = H(i, k)W(i, k)\begin{pmatrix} X_0[i, k] \\ X_1[i, k] \end{pmatrix} + U(i, k)$$

$$= Q(i, k)\begin{pmatrix} X_0[i, k] \\ X_1[i, k] \end{pmatrix} + U(i, k)$$

Wherein Q(i,k)=H(i,k)W(i,k) is an equivalent channel.

Obtain the channel transmission matrix $\hat{H}(i,k)$, and know the precoding matrix W(i,k) used at $k^{th}$ sub-carrier within $i^{th}$ OFDM symbol, and the equivalent channel can be obtained according to the following formula:

$$\hat{Q}(i,k)=\hat{H}(i,k)W(i,k)$$

For $k^{th}$ sub-carrier within $i^{th}$ OFDM bearing data, it can solve the MIMO problem by using multiple methods, and it takes the common Linear Minimum Mean Square Error (LMMSE) method as an example.

$$\begin{pmatrix} \hat{X}_0[i, k] \\ \hat{X}_1[i, k] \end{pmatrix} = G[i, k]\begin{pmatrix} Y_0[i, k] \\ Y_1[i, k] \end{pmatrix}$$

Wherein the equalization matrix G[i,k] is obtained by the following formula:

$$G[i,k]=(\hat{Q}^H(i,k)\hat{Q}(i,k)+N_0I)^{-1}\hat{Q}^H(i,k)$$

$\hat{Q}^H(i,k)$ is the conjugate transposed matrix of $\hat{Q}(i,k)$, and by the above steps, it can finally obtain the estimation of $X_0[i,k]$ and $X_1[i,k]$.

The problem of the above receiver is that calculation amount is large, especially, the operation amount of solving equalization matrix is large. In the above algorithm, assume that the order of the frequency domain interpolation filter is 24 (L=24), solving MIMO problem at each sub-carrier within each OFDM symbol needs 155 real number multiplication, 141 real number addition and 8 division on average.

For the modern broadband high speed data system, in order to ensure higher throughput rate and better real-time, the above complicated algorithm needs a large number of calculations, and may result in more power consumption of receivers and higher cost of receivers.

SUMMARY OF THE INVENTION

The technical problem to be solved by the present invention is to provide a demodulation method and demodulator for Orthogonal Frequency Division Multiplexing (OFDM)-Multiple Input Multiple Output (MIMO) with low complexity to reduce an amount of operation and complexity of an OFDM-MIMO receiver.

To solve the foregoing problems, the present invention provides a demodulation method for an Orthogonal Frequency Division Multiplexing (OFDM)-Multiple Input Multiple Output (MIMO) system, comprising:

a) by using a received reference signal, carrying out estimation and obtaining a channel estimation value at a reference signal sub-carrier in each channel;

b) by using the channel estimation value at the reference signal sub-carrier in each channel, carrying out calculation and obtaining an equalization matrix at the reference signal sub-carrier;

c) by using the equalization matrix obtained by calculation to carry out an interpolation calculation, obtaining the equalization matrixes at all of data sub-carriers;

d) by using data signals in various paths received from all of the data sub-carriers and corresponding equalization matrixes, obtaining an intermediate estimation value of transmitted data by calculation; and e) by using a precoding matrix to carry out de-precoding on the intermediate estimation value of the transmitted data, obtaining a final estimation value of the transmitted data.

The foregoing demodulation method can further have following characteristics:

in the step a), for each channel, firstly using a reference signal received from the channel, carry out estimation and obtain the channel estimation value at the reference signal sub-carrier of a signal in one path corresponding to the channel; then by time domain interpolation, obtain the channel estimation values at the reference signal sub-carriers of signals in other paths in the channel;

in the step b), carry out calculation and obtain the equalization matrix at the reference signal sub-carrier of a signal in each path;

in the step c), using the obtained equalization matrix, by an operation of frequency domain interpolation and time domain interpolation, obtain the equalization matrixes at all of the data sub-carriers.

The foregoing demodulation method can further have following characteristics:

after the step a) and before the step b), the method further comprises: performing frequency domain filtering for the channel estimation value at each reference signal sub-carrier obtained by each channel;

the step b) carries out calculation and obtains the equalization matrix at the reference signal sub-carrier by using channel estimation values after filtering.

The foregoing demodulation method can further have following characteristics: in the step b), firstly according to the channel estimation value at the reference signal sub-carrier of the signal in each path in each channel, constitute a channel transmission matrix $\hat{H}[j,l]$ at the reference signal sub-carrier, then carry out calculation and obtain the equalization matrix at the reference signal sub-carrier by employing a following formula:

$$\tilde{G}[j,l] = (\hat{H}^H[j,l]\hat{H}[j,l] + N_0 I)^{-1} \hat{H}^H[j,l]$$

wherein, $\tilde{G}[j,l]$ is an equalization matrix at a $l^{th}$ sub-carrier within a $j^{th}$ OFDM, and j is a sequence number of OFDM bearing the reference signal, l is a sequence number of the reference signal sub-carrier within the $j^{th}$ OFDM, $N_0$ is noise power of each dimension, I is a unit matrix, and $\hat{H}^H(j,l)$ is a conjugate transposed matrix of $\hat{H}(j,l)$.

The foregoing demodulation method can further have the following characteristics:

in the step c), firstly using the obtained equalization matrix to carry out the frequency domain interpolation, obtain the equalization matrix at all of the data sub-carriers within a OFDM symbol bearing the reference signal and perform filtering at the same time, a formula is as below:

$$G[j,k] = \sum_{f=-L'/2}^{L'/2} F'(f)\tilde{G}[j,k+f]$$

wherein, $\tilde{G}[j,k]$ and $G[j,k]$ are respectively an equalization matrix at a $k^{th}$ sub-carrier within a $j^{th}$ OFDM before filtering and after filtering, L' is a filtering window length of filter, f is any integer within a scope of $[-L'/2, L'/2]$, j is a sequence number of OFDM bearing the reference signal, k is a sequence number of the sub-carrier, k,j are both integers and F'(f) is a low pass filter;

then, using the obtained equalization matrix to carry out the time domain interpolation, obtain the equalization matrix at all of data sub-carrier within the OFDM symbol bearing the data signal only.

The foregoing demodulation method can further have the following characteristics: in the step d), carry out calculation and obtain the intermediate estimation value of the transmitted data by employing a following formula:

$$\begin{pmatrix} \tilde{V}_0[i,k] \\ \tilde{V}_1[i,k] \end{pmatrix} = G(i,k) \begin{pmatrix} Y_0[i,k] \\ Y_1[i,k] \end{pmatrix}$$

wherein, $\tilde{V}_0[i,k]$ and $\tilde{V}_1[i,k]$ are respectively an intermediate estimation value of transmitted signals in $0^{th}$ path and $1^{st}$ path at a $k^{th}$ data sub-carrier within an $i^{th}$ OFDM symbol, G(i,k) is an equalization matrix at the $k^{th}$ data sub-carrier within the $i^{th}$ OFDM symbol obtained in the step c), $Y_0[i,k]$ and $Y_1[i,k]$ are data signals in $0^{th}$ path and $1^{st}$ path received at the $k^{th}$ data sub-carrier within the $i^{th}$ OFDM symbol respectively, k is a sequence number of the sub-carrier, i is a sequence number of the OFDM symbol and k,i are both integers;

in the step e), carry out calculation to obtain a final estimation value of the transmitted data by employing a following formula:

$$\begin{pmatrix} \tilde{X}_0[i,k] \\ \tilde{X}_1[i,k] \end{pmatrix} = W^H(i,k) \begin{pmatrix} \tilde{V}_0[i,k] \\ \tilde{V}_1[i,k] \end{pmatrix}$$

wherein, $\tilde{X}_0[i,k]$ and $\tilde{X}_1[i,k]$ are estimation values of transmitted data in $0^{th}$ path and $1^{st}$ path at a $k^{th}$ data sub-carrier within an $i^{th}$ OFDM symbol respectively, W(i,k) is a precoding matrix at the $k^{th}$ data sub-carrier within the $i^{th}$ OFDM symbol and $W^H(i,k)$ is a conjugate transposed matrix of W(i,k).

Accordingly, a demodulator for an Orthogonal Frequency Division Multiplexing (OFDM)-Multiple Input Multiple Output (MIMO) system provided by the present invention comprises: a plurality of OFDM demodulation modules and a corresponding frame parsing module, a precoding matrix generation module, a partial channel estimation module, a partial equalization matrix generation module, an equalization matrix interpolation module, a MIMO demodulation module and a de-precoding module, wherein:

the partial channel estimation module is configured to: receive a reference signal transmitted by each frame parsing module, and carry out estimation to obtain and transmit a channel estimation value at a reference signal sub-carrier in each channel to the partial equalization matrix generation module;

the partial equalization matrix generation module is configured to: by using the received channel estimation value at the reference signal sub-carrier in each channel, carry out calculation to obtain and transmit an equalization matrix at the reference signal sub-carrier to the equalization matrix interpolation module;

the equalization matrix interpolation module is configured to: by using the received equalization matrix to carry out interpolation operation, obtain and transmit equalization matrixes at all of data sub-carriers to the MIMO demodulation module;

the MIMO demodulation module is configured to: by using data signals in various paths at all of data sub-carrier transmitted by the frame parsing module and the equalization matrixes transmitted by the equalization matrix interpolation module, carry out calculation to obtain and transmit an intermediate estimation value of transmitted data to the de-precoding module;

the de-precoding module is configured to: by using a precoding matrix transmitted by the precoding matrix generation module, carry out de-precoding on the intermediate estimation value of the transmitted data, and obtain a final estimation value of the transmitted data.

The foregoing demodulator can further have the following characteristics:

the partial channel estimation module is configured to: for each channel, firstly utilize a reference signal received from the channel to estimate and obtain a channel estimation value at a reference signal sub-carrier of a signal in one path corresponding to the channel, and then by time domain interpolation, obtain channel estimation values at reference signal sub-carriers of signals in other paths in the channel;

the partial equalization matrix generation module is configured to: calculate and obtain the equalization matrix at the reference signal sub-carrier of the signal in each path;

the equalization matrix interpolation module is configured to: by using the obtained equalization matrix, obtain equalization matrixes at all of data sub-carriers by the operation of frequency domain interpolation and time domain interpolation;

the foregoing demodulator can further have the following characteristics:

the partial channel estimation module is further configured to: perform frequency domain filtering for an obtained channel estimation value at each reference signal sub-carrier, and transmit the channel estimation value after filtering at each reference signal sub-carrier to the partial equalization matrix generation module.

The foregoing demodulator can further have the following characteristics:

the MIMO demodulation module is configured to calculate and obtain an intermediate estimation value of the transmitted data by employing a following formula:

$$\begin{pmatrix} \tilde{V}_0[i,k] \\ \tilde{V}_1[i,k] \end{pmatrix} = G(i,k) \begin{pmatrix} Y_0[i,k] \\ Y_1[i,k] \end{pmatrix}$$

wherein, $\tilde{V}_0[i,k]$ and $\tilde{V}_1[i,k]$ are intermediate estimation values of transmitted signals in $0^{th}$ path and $1^{st}$ path at a $k^{th}$ data sub-carrier within a $i^{th}$ OFDM symbol respectively, $G(i,k)$ is an equalization matrix at the $k^{th}$ data sub-carrier within the $i^{th}$ OFDM symbol, $Y_0[i,k]$ and $Y_1[i,k]$ are data signals in $0^{th}$ path and $1^{st}$ path received at the $k^{th}$ data sub-carrier within the $i^{th}$ OFDM symbol respectively, k is a sequence number of sub-carrier, i is a sequence number of OFDM symbol, and k,i are both integers;

the de-precoding module is configured to calculate and obtain a final estimation value of the transmitted data by employing a following formula:

$$\begin{pmatrix} \tilde{X}_0[i,k] \\ \tilde{X}_1[i,k] \end{pmatrix} = W^H(i,k) \begin{pmatrix} \tilde{V}_0[i,k] \\ \tilde{V}_1[i,k] \end{pmatrix}$$

wherein, $\tilde{X}_0[i,k]$ and $\tilde{X}_1[i,k]$ are estimation values of transmitted data in $0^{th}$ path and $1^{st}$ path at a $k^{th}$ data sub-carrier within an $i^{th}$ OFDM symbol respectively, $W(i,k)$ is an precoding matrix at the $k^{th}$ data sub-carrier within the $i^{th}$ OFDM symbol, and $W^H(i,k)$ is a conjugate transposed matrix of $W(i,k)$.

Using the foregoing practical OFDM-MIMO demodulator and demodulation method with low complexity, it realizes OFDM-MIMO demodulation, and comparing with the prior art, carry out joint design on its channel estimation module and the MIMO equalization matrix generation, and on the basis of ensuring the performance, it saves the intermediate operation amount, and this will be advantageous to realizing the OFDM-MIMO receiver with low power consumption and low cost.

PREFERRED EMBODIMENTS OF THE PRESENT INVENTION

Specific embodiments of the present invention are described in detail below in combination with the drawings.

Figure 5:
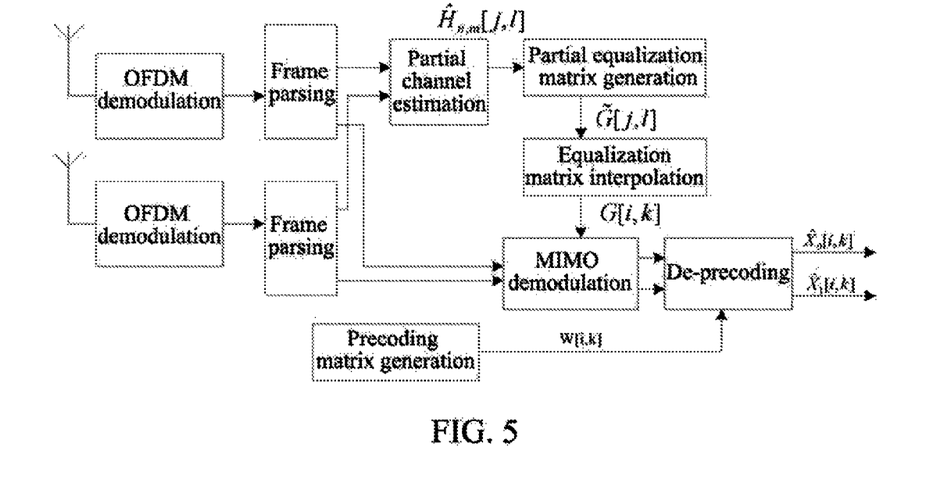
FIG. 5 is a schematic diagram of the OFDM-MIMO receiver with low complexity in the example of the present invention.

The OFDM-MIMO demodulator with low complexity in the present example comprises an OFDM demodulation module, a frame parsing module, a precoding matrix generation module, a partial channel estimation module, a partial equalization matrix generation module, an equalization matrix interpolation module, a MIMO demodulation module and a de-precoding module, wherein the OFDM demodulation module, the frame parsing module and the precoding matrix generation module are the same as the modules in the prior art.

Each receiving antenna corresponds to one OFDM demodulation module, and each OFDM demodulation module extracts OFDM signal in synchronization, removes the cyclic prefix and carries out fast Fourier transform (FFT), so as to obtain the framing OFDM frequency domain data signal which is transmitted to the corresponding frame parsing module. Each frame parsing module separates the data signal from the reference signal in OFDM, and transmits the reference signal to the partial channel estimation module, and transmits the data signal to a MIMO demodulation module; an equalization matrix is generated after the reference signal passes through the partial channel estimation module, partial equalization matrix generation module and equalization matrix interpolation module in turn, and the equalization matrix is transmitted to the MIMO demodulation module; the MIMO demodulation module utilizes the equalization matrix and data signal to obtain and transmit the intermediate estimation value of the transmitted data to the de-precoding module, and the de-precoding module utilizes generated precoding and the intermediate estimation value of the transmitted data to obtain a final estimation value of the transmitted data.

The specific function of each module and signal transitive relation of the example which are different with that of the prior art is as follows:

the partial channel estimation module is used for receiving the reference signal transmitted by each frame parsing module and carrying out estimation to obtain and transmit the channel estimation value at the reference signal sub-carrier in each channel to the partial equalization matrix generation module;

the partial equalization matrix generation module is used for by using the received channel estimation value at the reference signal sub-carrier in each channel, carrying out calculation to obtain and transmit an equalization matrix at the reference signal sub-carrier to the equalization matrix interpolation module;

the equalization matrix interpolation module is used for utilizing the received equalization matrix to carry out interpolation operation to obtain and transmit equalization matrixes at all of data sub-carriers to the MIMO demodulation module;

the MIMO demodulation module is used for by using data signals in various paths at all of the data sub-carriers transmitted by the frame parsing module and equalization matrixes transmitted by the equalization matrix interpolation module, carrying out calculation to obtain and transmit the intermediate estimation value of the transmitted data to the de-precoding module;

the de-precoding module is used for by using a precoding matrix transmitted by the precoding matrix generation module, carrying out de-precoding on the intermediate estimation value of the transmitted data to obtain a final estimation value of the transmitted data.

Figure 6:
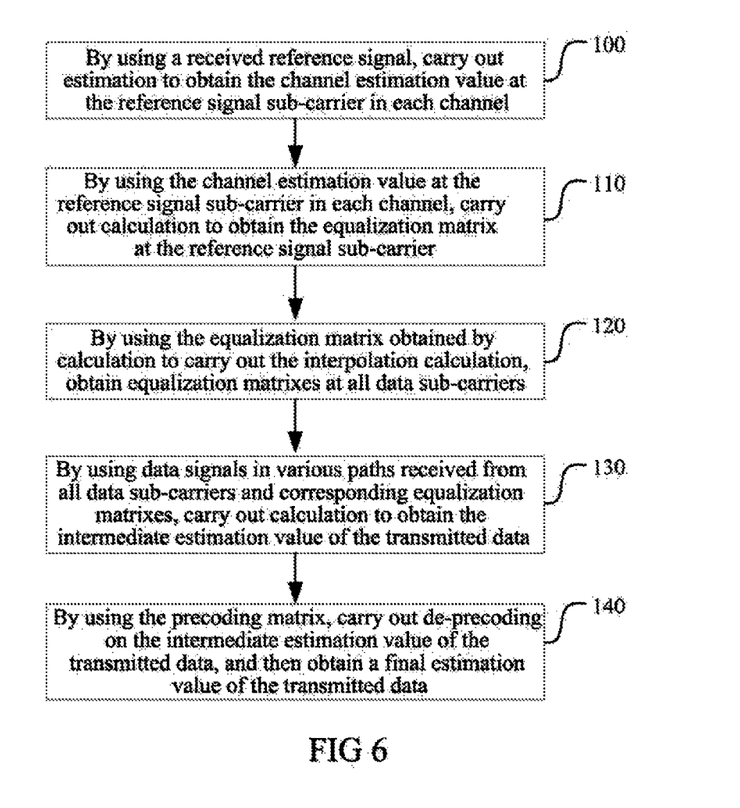
FIG. 6 is a flow chart of the OFDM-MIMO demodulation method in the example of the present invention.

The OFDM-MIMO demodulation method with low complexity described in the present example comprises the following steps:

Step 100, by using a received reference signal, the channel estimation value at the reference signal sub-carrier in each channel is obtained by estimation;

Step 110, by using the channel estimation value at the reference signal sub-carrier in each channel, an equalization matrix at the reference signal sub-carrier is obtained by calculation;

Step 120, by using the equalization matrix obtained by calculation, the interpolation calculation is carried out to obtain equalization matrixes at all data sub-carriers;

Step 130, by using the data signals in various paths received from all data sub-carriers and corresponding equalization matrixes, an intermediate estimation value of the transmitted data is obtained by calculation;

Step 140, by using a precoding matrix, de-precoding is carried out on the intermediate estimation value of the transmitted data to obtain a final estimation value of the transmitted data.

In the following, it takes the situation of the receiving end having 2 receiving antennas and 2 transmitting antennas as an application example for illustration, assuming that the distribution of the reference signal is still shown in FIG. 2 and FIG. 3. It needs to be illustrated that the following method can be applied readily to other numbers of receiving antennas and transmitting antennas and the situation of distributions of other reference signals.

The corresponding demodulation method comprises the following steps:

Step one, process the receiving signal of each antenna to obtain the frequency domain signal of the multiframe in each path, and separate the data signal from the reference signal in the signal of each path;

Step two, for each channel between the transmitting end and the receiving end, by using a reference signal received from the channel, estimate and obtain the channel estimation value at the reference signal sub-carrier of the signal in one path corresponding to the channel;

as for the reference signal distribution shown in FIG. 2 and FIG. 3, for the channel from transmitting antenna 0 to each receiving antenna, the step can estimate and obtain the channel estimation value at the grid marked with $R_0$ in FIG. 2. The processing of the step is the same as the processing in the steps A and B in the background art, and the specific algorithm will not be repeated here.

Step three, utilize the obtained channel estimation value at each reference signal sub-carrier to perform time domain interpolation, so as to obtain channel estimation values at the reference signal sub-carriers of the signals in other paths;

the processing of the step is the same as the processing in the step C in the background art, and the specific algorithm will not be repeated here.

By the steps above, the channel estimation value at the reference signal sub-carrier of the signal of each path in each channel is obtained. As for the distribution of the reference signal shown in FIG. 2 and FIG. 3, the channel estimation value at the grid marked with slashes and cross-lines shown in FIG. 2 and FIG. 3 of each channel is obtained.

Step four, performing frequency domain filtering on the obtained channel estimation value at each reference signal sub-carrier of each channel;

when performing frequency domain filtering on various channel estimation values obtained by the channel from the $n^{th}$ transmitting antenna to the $m^{th}$ receiving antenna, the based formula is as follows:

$$\hat{H}_{m,n}[j, l] = \sum_{f=-L/2}^{L/2} F(f)\tilde{H}_{m,n}[j, l+f]$$

Wherein, $\tilde{H}_{m,n}[j,l+f]$ represents the channel estimation value before filtering at $(l+f)^{th}$ sub-carrier within $j^{th}$ OFDM, $\hat{H}_{m,n}[j,l]$ represents the channel estimation value after filtering at $l^{th}$ sub-carrier within $j^{th}$ OFDM, j is a sequence number of OFDM bearing a reference signal, l is a sequence number at a reference signal sub-carrier within $j^{th}$ OFDM, the value of f needs to satisfy that l+f is still a sequence number of a reference signal sub-carrier within $j^{th}$ OFDM, L is the filtering window length of the first filter, m is a sequence number of receiving antenna, n is a sequence number of transmitting antenna, j, l, f, m, n, L are all integers and F(f) is a low pass filter, whose design of the passband and stopband can refer to the priori knowledge of channel impulse response length and the like.

This step is optional. The order of this step and step two and three can be adjusted, for example, it can firstly perform channel estimation and frequency domain filtering on one channel, then performing channel estimation and frequency domain filtering on the remaining channels one by one.

Step five, by using the channel estimation value at each reference signal sub-carrier after filtering in each channel, equalization matrixes at these reference signal sub-carriers are obtained by calculation;

firstly according to channel estimation value at each reference signal sub-carrier in each channel, the channel transmission matrix Ĥ[j,l] at each reference signal sub-carrier is constituted, for example, when m=0, 1 and n=0, 1, there is:

$$\hat{H}[j,l] = \begin{pmatrix} \hat{H}_{0,0}[j,l] & \hat{H}_{0,1}[j,l] \\ \hat{H}_{1,0}[j,l] & \hat{H}_{1,1}[j,l] \end{pmatrix}$$

The formula to calculate the equalization matrix according to channel transmission matrix in the example is as follows:

$$\tilde{G}[j,l] = (\hat{H}^H[j,l]\hat{H}[j,l] + N_0 I)^{-1}\hat{H}^H[j,l]$$

wherein, $\tilde{G}[j,l]$ is an equalization matrix at $l^{th}$ sub-carrier within $j^{th}$ OFDM, $N_0$ is noise power of each dimension and I is a unit matrix.

Step six, by using the obtained equalization matrix at each reference signal sub-carrier, carry out interpolation to obtain equalization matrixes at all of data sub-carriers:

Firstly carry out the frequency domain interpolation, so that the equalization matrixes at all of data sub-carriers within OFDM symbol bearing reference signal are obtained.

In the examples, it performs filtering operation for equalization matrix when carrying out frequency domain interpolation. For the $j^{th}$ OFDM symbol, the formula which the operation is based on is as follows:

$$G[j,k] = \sum_{f=-L'/2}^{L'/2} F'(f)\tilde{G}[j,k+f]$$

wherein, $\tilde{G}[j,k]$ and $G[j,k]$ are equalization matrixes at $k^{th}$ sub-carrier within $j^{th}$ OFDM before filtering and after filtering respectively; L' is the filtering window length of the second filter, f is any integer within the scope of [−L/2, L'/2], k=0, 1, . . . , K, K is a maximum sequence number of sub-carrier and F'(f) is the second low pass filter.

In another example, equalization matrixes at all of data sub-carriers within the OFDM symbol bearing the reference signal can be obtained by carrying out frequency domain interpolation only, and when carrying out frequency domain interpolation, for the equalization matrix of one data sub-carrier, it can be obtained by weighting equalization matrixes of two most adjacent reference signal sub-carriers, which is similar to the time domain interpolation algorithm and will not be described in detail.

Secondly, carry out the time domain interpolation so that the equalization matrixes at all of data sub-carriers within the OFDM symbol bearing only the data signal are obtained. For the $(j+d)^{th}$ OFDM symbol, there is:

$$G[j+d,k] = \frac{D-d}{D}G[j,k] + \frac{d}{D}G[j+D,k]$$

Wherein, d=1, 2, . . . , D−1, D is the time domain interval of the reference signal, and according to the distribution of the reference signal of FIG. 2 and FIG. 3, D=4, and when not performing filtering operation on the equalization matrix, G[j,k] equals $\tilde{G}[j,l]$.

Step seven, basing on data signals of various paths received at all of data sub-carriers and the corresponding equalization matrixes, an intermediate estimation value of the transmitted signal is obtained;

calculating it by employing the following formula:

$$\begin{pmatrix} \tilde{V}_0[i,k] \\ \tilde{V}_1[i,k] \end{pmatrix} = G(i,k)\begin{pmatrix} Y_0[i,k] \\ Y_1[i,k] \end{pmatrix}$$

Channel transmission model is:

$$\begin{pmatrix} Y_0[i,k] \\ Y_1[i,k] \end{pmatrix} = H(i,k)W(k)\begin{pmatrix} X_0[i,k] \\ X_1[i,k] \end{pmatrix} + U(i,k)$$

It can be seen that, $$\begin{pmatrix} \tilde{V}_0[i,k] \\ \tilde{V}_1[i,k] \end{pmatrix}$$

is actually the estimation of the intermediate value $$\begin{pmatrix} V_0[i,k] \\ V_1[i,k] \end{pmatrix} = W(i,k)\begin{pmatrix} X_0[i,k] \\ X_1[i,k] \end{pmatrix}.$$

wherein, $\tilde{V}_0[i,k]$ and $\tilde{V}_1[i,k]$ are intermediate estimation values of the transmitted signal of $0^{th}$ path and $1^{st}$ path at $k^{th}$ data sub-carrier within $i^{th}$ OFDM symbol respectively, $Y_0[i,k]$ and $Y_1[i,k]$ are data signals of $0^{th}$ path and $1^{st}$ path received at $k^{th}$ data sub-carrier within $i^{th}$ OFDM symbol respectively, k is a sequence number of sub-carrier, i is a sequence number of the OFDM symbol and k,i are both integers.

Step eight, basing on the precoding matrix and intermediate estimation value of the transmitted signal, after carrying out de-precoding on the intermediate estimation value of the transmitted data, carry out calculation to obtain the estimation value after de-precoding of the transmitted signal;

since each column of the precoding matrix is orthogonal, $W^H(i,k)W(i,k)$ is an unit diagonal matrix, and W(i,k) is a precoding matrix at $k^{th}$ data sub-carrier within $i^{th}$ OFDM, therefore, an estimation value of the transmitted signal can be obtained by calculation with the following formula:

$$\begin{pmatrix} \hat{X}_0[i,k] \\ \hat{X}_1[i,k] \end{pmatrix} = W^H(i,k)\begin{pmatrix} \tilde{V}_0[i,k] \\ \tilde{V}_1[i,k] \end{pmatrix}$$

wherein, $\hat{X}_0[i,k]$ is the estimation value of transmitted data in $0^{th}$ path at $k^{th}$ data sub-carrier within $i^{th}$ OFDM symbol, $\hat{X}_1[i,k]$ is the estimation value after de-precoding of transmitted signal in $1^{st}$ path at $k^{th}$ data sub-carrier within $i^{th}$ OFDM symbol.

The OFDM-MIMO receiver with low complexity of the example is shown in FIG. 5, and the hardware module part comprises OFDM demodulation modules in two paths, frame parsing modules in two paths, a precoding matrix generation module, a partial channel estimation module, a partial equalization matrix generation module, an equalization matrix interpolation module, a MIMO demodulation module and a de-precoding module, and the signal transmission relationship between various modules is the same as that in the aforementioned examples. Wherein: the partial channel estimation module is used for performing the processing in the aforementioned step two, step three and step four, the partial equalization matrix generation module is used for performing the processing in the aforementioned step five, the equalization matrix interpolation module is used for performing the processing in step six, the MIMO demodulation module is used for performing the processing in step seven and the de-precoding module is used for performing the processing in step eight. Please refer to the steps in the method of the example for specific processing, which will not be repeated here.

Compared with the existing method, the scheme of the aforementioned examples firstly uses channel estimation value at the reference signal sub-carrier to calculate the equalization matrix at the reference signal sub-carrier, then the equalization matrix at each data sub-carrier is obtained by interpolation, so as to reduce the operation amount of the most complex process of solving equalization matrix. Therefore, by using the receiver designed in the example, the calculation amount of the channel estimation part and demodulation part is much lower. Assume that the order of the frequency domain interpolation filter is 24 (L=24), and for the existing method, solving the MIMO problem at each sub-carrier within each OFDM symbol needs 155 real number multiplication, 141 real number addition, 8 division on average; however, by using the method in the example, solving the MIMO problem at each sub-carrier within each OFDM symbol needs 87 real number multiplication, 85 real number addition, 0.73 division on average; the requirement of the operation is saved significantly.

Furthermore, the prior art is to perform the operation of de-precoding to generate an equivalent channel before generating the equalization matrix, however, the scheme of the aforementioned embodiment perform de-precoding after MIMO demodulation, which avoids the disadvantageous influence on the equalization matrix interpolation operation by the destruction brought by de-precoding to the correlation of the time domain and frequency domain between various sub-carriers. According to the demonstration of simulation experiment, using the method of the present invention will not cause the obvious decrease of performance of the receiver.

On the basis of the aforementioned example, there can be some simple transforms, and for example, in one variation, after the channel estimation value at the reference signal sub-carrier of the signal in one path is obtained by estimation according to the reference signal, equalization matrixes at these reference signal sub-carriers are obtained by calculation, and the equalization matrixes at the reference signal sub-carriers of signals in other paths and the equalization matrixes at all data sub-carriers are obtained by interpolation operation. Thus, the operation amount is lower. Similarly, in another variation, after the channel estimation value at the reference signal sub-carrier of the signal in one path is obtained by estimation according to the reference signal, the channel estimation values at all of the sub-carriers within the OFDM symbol bearing the reference signal is obtained by interpolation, then calculate the equalization matrixes at all of the sub-carriers within these OFDM symbols, then the equalization matrixes at all of the sub-carriers within the OFDM symbol bearing only the data signal are obtained by interpolation. Thus, the operation amount is larger than that in the aforementioned examples. The above two variations can achieve the engineering requirement in the performance.

For the modern broadband high speed data system, in order to ensure higher throughput rate and better real-time, the OFDM-MIMO demodulator with low complexity in the present invention will save power consumption and cost obviously, which will be advantageous to providing the solution of the receiver with lower power consumption and lower cost.

INDUSTRIAL APPLICABILITY

Using the foregoing practical the OFDM-MIMO demodulator and demodulation method with low complexity, it realizes the OFDM-MIMO demodulation, and comparing with the prior art, carry out joint design on its channel estimation module and the MIMO equalization matrix generation, and on the basis of ensuring the performance, it saves the intermediate operation amount, and this will be advantageous to realizing the OFDM-MIMO receiver with low power consumption and low cost.

What is claimed is:

1. A demodulation method for an Orthogonal Frequency Division Multiplexing (OFDM)-Multiple Input Multiple Output (MIMO) system, comprising:
   a) by using a received reference signal, carrying out estimation to obtain a channel estimation value at a reference signal sub-carrier in each channel;
   b) by using the channel estimation value at the reference signal sub-carrier in each channel, carrying out calculation to obtain an equalization matrix at the reference signal sub-carrier;
   c) by using the equalization matrix obtained by calculation to carry out an interpolation calculation, obtaining the equalization matrixes at all of data sub-carriers;
   d) by using data signals in various paths received from all of the data sub-carriers and corresponding equalization matrixes, carrying out calculation to obtain an intermediate estimation value of transmitted data; and
   e) by using a precoding matrix to carry out de-precoding on the intermediate estimation value of the transmitted data, obtaining a final estimation value of the transmitted data;
   wherein, in the step d), carry out calculation to obtain the intermediate estimation value of the transmitted data by employing a following formula:

$$\begin{pmatrix} \tilde{V}_0[i,k] \\ \tilde{V}_1[i,k] \end{pmatrix} = G(i,k) \begin{pmatrix} Y_0[i,k] \\ Y_1[i,k] \end{pmatrix}$$

wherein, $\tilde{V}_0[i,k]$ and $\tilde{V}_1[i,k]$ are respectively intermediate estimation values of transmitted signals in $0^{th}$ path and $1^{st}$ path at a $k^{th}$ data sub-carrier within an $i^{th}$ OFDM symbol, $G(i,k)$ is an equalization matrix at the $k^{th}$ data sub-carrier within the $i^{th}$ OFDM symbol obtained in the step c), $Y_0[i,k]$ and $Y_1[i,k]$ are data signals in the $0^{th}$ path and $1^{st}$ path received at the $k^{th}$ data sub-carrier within the $i^{th}$ OFDM symbol respectively, k is a sequence number of sub-carrier, i is a sequence number of the OFDM symbol and k,i are both integers;
   in the step e), carry out calculation to obtain the final estimation value of the transmitted data by employing a following formula:

$$\begin{pmatrix} \tilde{X}_0[i,k] \\ \tilde{X}_1[i,k] \end{pmatrix} = W^H(i,k) \begin{pmatrix} \tilde{V}_0[i,k] \\ \tilde{V}_1[i,k] \end{pmatrix}$$

wherein, $\tilde{X}_0[i,k]$ and $\tilde{X}_1[i,k]$ are estimation values of transmitted data in the $0^{th}$ path and $1^{st}$ path at the $k^{th}$ data sub-carrier within the $i^{th}$ OFDM symbol respectively, $W(i,k)$ is a precoding matrix at the $k^{th}$ data sub-carrier within the i$^{th}$ OFDM symbol and W$^H$(i,k) is a conjugate transposed matrix of W(i,k).

2. The demodulation method according to claim 1, wherein, in the step a), for each channel, by using a reference signal received from the channel firstly, carry out estimation to obtain the channel estimation value at the reference signal sub-carrier of a signal in one path corresponding to the channel; then by time domain interpolation, obtain the channel estimation values at the reference signal sub-carriers of signals in other paths in the channel;

in the step b), carry out calculation to obtain the equalization matrix at the reference signal sub-carrier of a signal in each path;

in the step c), using the obtained equalization matrix, by an operation of frequency domain interpolation and time domain interpolation, obtain the equalization matrixes at all of the data sub-carriers.

3. The demodulation method according to claim 1, wherein, after the step a) and before the step b), the method further comprises: performing frequency domain filtering for the channel estimation value at each reference signal sub-carrier obtained by each channel;

the step b) carries out calculation to obtain the equalization matrix at the reference signal sub-carrier by using a channel estimation value after filtering.

4. The demodulation method according to claim 2, wherein, in the step b), firstly according to the channel estimation value at the reference signal sub-carrier of the signal in each path in each channel, constitute a channel transmission matrix $\hat{H}[j,l]$ at the reference signal sub-carrier, and then carry out calculation to obtain the equalization matrix at the reference signal sub-carrier by employing a following formula:

$$\tilde{G}[j,l] = (\hat{H}^H[j,l]\hat{H}[j,l] + N_0 I)^{-1} \hat{H}^H[j,l]$$

wherein, $\tilde{G}[j,l]$ is an equalization matrix at a l$^{th}$ sub-carrier within a j$^{th}$ OFDM, j is a sequence number of OFDM bearing the reference signal, l is a sequence number of the reference signal sub-carrier within the j$^{th}$ OFDM, $N_0$ is noise power of each dimension, I is a unit matrix and $\hat{H}^H$(j,l) is a conjugate transposed matrix of $\hat{H}$(j,l).

5. The demodulation method according to claim 2, wherein, in the step c), firstly use the obtained equalization matrix to carry out the frequency domain interpolation, and obtain the equalization matrixes at all of the data sub-carriers within an OFDM symbol bearing the reference signal and perform filtering at the same time, and a formula is as below:

$$G[j,k] = \sum_{f=-L'/2}^{L'/2} F'(f) \tilde{G}[j, k+f]$$

wherein, $\tilde{G}[j,k]$ and $G[j,k]$ are respectively equalization matrixes at a k$^{th}$ sub-carrier within a j$^{th}$ OFDM before filtering and after filtering, L' is a filtering window length of filter, f is any integer within a scope of [−L'/2, L'/2], j is a sequence number of OFDM bearing the reference signal, k is a sequence number of sub-carrier, k,j are both integers and F'(f) is a low pass filter;

then, use the obtained equalization matrix to carry out the time domain interpolation, and obtain the equalization matrixes at all of the data sub-carriers within an OFDM symbol bearing the data signal only.

6. A demodulator for an Orthogonal Frequency Division Multiplexing (OFDM)-Multiple Input Multiple Output (MIMO) system, comprising: a plurality of OFDM demodulation modules and a corresponding frame parsing module, a precoding matrix generation module, a partial channel estimation module, a partial equalization matrix generation module, an equalization matrix interpolation module, a MIMO demodulation module and a de-precoding module, wherein the partial channel estimation module is configured to: receive a reference signal transmitted by each frame parsing module, and carry out estimation to obtain and transmit a channel estimation value at a reference signal sub-carrier in each channel to the partial equalization matrix generation module;

the partial equalization matrix generation module is configured to: by using the received channel estimation value at the reference signal sub-carrier in each channel, carry out calculation to obtain and transmit an equalization matrix at the reference signal sub-carrier to the equalization matrix interpolation module;

the equalization matrix interpolation module is configured to: by using the received equalization matrix to carry out interpolation operation, obtain and transmit equalization matrixes at all of data sub-carriers to the MIMO demodulation module;

the MIMO demodulation module is configured to: by using data signals in various paths at all of data sub-carriers transmitted by the frame parsing module and the equalization matrixes transmitted by the equalization matrix interpolation module, carry out calculation to obtain and transmit an intermediate estimation value of transmitted data to the de-precoding module;

the de-precoding module is configured to: by using a precoding matrix transmitted by the precoding matrix generation module, carry out de-precoding on the intermediate estimation value of the transmitted data, and obtain a final estimation value of the transmitted data;

wherein, the MIMO demodulation module is configured to calculate and obtain an intermediate estimation value of the transmitted data by employing a following formula:

$$\begin{pmatrix} \tilde{V}_0[i,k] \\ \tilde{V}_1[i,k] \end{pmatrix} = G(i,k) \begin{pmatrix} Y_0[i,k] \\ Y_1[i,k] \end{pmatrix}$$

wherein, $\tilde{V}_0[i,k]$ and $\tilde{V}_1[i,k]$ are intermediate estimation values of transmitted signals in 0$^{th}$ path and 1$^{st}$ path at a k$^{th}$ data sub-carrier within a i$^{th}$ OFDM symbol respectively, G(i,k) is an equalization matrix at the k$^{th}$ data sub-carrier within the i$^{th}$ OFDM symbol, $Y_0[i,k]$ and $Y_1[i,k]$ are data signals in the 0$^{th}$ path and 1$^{st}$ path received at the k$^{th}$ data sub-carrier within the i$^{th}$ OFDM symbol respectively, k is a sequence number of sub-carrier, i is a sequence number of OFDM symbol, and k,i are both integers;

the de-precoding module is configured to calculate and obtain the final estimation value of the transmitted data by employing a following formula:

$$\begin{pmatrix} \tilde{X}_0[i,k] \\ \tilde{X}_1[i,k] \end{pmatrix} = W^H(i,k) \begin{pmatrix} \tilde{V}_0[i,k] \\ \tilde{V}_1[i,k] \end{pmatrix}$$

wherein, $\tilde{X}_0[i,k]$ and $\tilde{X}_1[i,k]$ are estimation values of the transmitted data in the 0$^{th}$ path and 1$^{st}$ path at the k$^{th}$ data sub-carrier within the i$^{th}$ OFDM symbol respectively, W(i,k) is an precoding matrix at the k$^{th}$ data sub-carrier within the $i^{th}$ OFDM symbol, and $W^H(i,k)$ is a conjugate transposed matrix of $W(i,k)$.

7. The demodulator according to claim 6, wherein, the partial channel estimation module is configured to: for each channel, firstly utilize the reference signal received from the channel to estimate and obtain the channel estimation value at the reference signal sub-carrier of a signal in one path corresponding to the channel, and then by time domain interpolation, obtain the channel estimation values at the reference signal sub-carriers of signals in other paths in the channel;

the partial equalization matrix generation module is configured to: calculate and obtain the equalization matrix at the reference signal sub-carrier of the signal in each path;

the equalization matrix interpolation module is configured to: by using the obtained equalization matrix, obtain equalization matrixes at all of the data sub-carriers by an operation of frequency domain interpolation and time domain interpolation.

8. The demodulator according to claim 7, wherein, the partial channel estimation module is further configured to: perform frequency domain filtering for the obtained channel estimation value at each reference signal sub-carrier, and transmit a channel estimation value after filtering at each reference signal sub-carrier to the partial equalization matrix generation module.

9. The demodulation method according to claim 2, wherein, after the step a) and before the step b), the method further comprises: performing frequency domain filtering for the channel estimation value at each reference signal sub-carrier obtained by each channel;

the step b) carries out calculation to obtain the equalization matrix at the reference signal sub-carrier by using a channel estimation value after filtering.

\* \* \* \* \*

UNITED STATES PATENT AND TRADEMARK OFFICE
CERTIFICATE OF CORRECTION

| | | |
|---|---|---|
| PATENT NO. | : 8,548,101 B2 | Page 1 of 1 |
| APPLICATION NO. | : 13/258066 | |
| DATED | : October 1, 2013 | |
| INVENTOR(S) | : Gong | |

It is certified that error appears in the above-identified patent and that said Letters Patent is hereby corrected as shown below:

On the title page, item (54) and in the Specification, column 1, line 1, the correct title is "Demodulation Method and Demodulator for Orthogonal Frequency Division Multiplexing - Multiple Input Multiple Output System".

Signed and Sealed this
Twenty-sixth Day of November, 2013

Margaret A. Focarino
*Commissioner for Patents of the United States Patent and Trademark Office*